US008914415B2

(12) United States Patent
Ghoting et al.

(10) Patent No.: US 8,914,415 B2
(45) Date of Patent: Dec. 16, 2014

(54) SERIAL AND PARALLEL METHODS FOR I/O EFFICIENT SUFFIX TREE CONSTRUCTION

(75) Inventors: Amol N. Ghoting, Yorktown Heights, NY (US); Konstantin Makarychev, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 931 days.

(21) Appl. No.: 12/697,159

(22) Filed: Jan. 29, 2010

(65) Prior Publication Data

US 2011/0191382 A1    Aug. 4, 2011

(51) Int. Cl.
*G06F 17/30* (2006.01)
(52) U.S. Cl.
CPC ..................... *G06F 17/30* (2013.01)
USPC .......................... 707/797; 707/803
(58) Field of Classification Search
CPC ... G06F 19/22; G06F 19/18; G06F 17/30153; G06F 17/30289; G06F 17/30327
USPC ................... 707/797, E17.012, 803
See application file for complete search history.

(56) References Cited

U.S. PATENT DOCUMENTS

| | | | | |
|---|---|---|---|---|
| 6,657,625 | B1 * | 12/2003 | Chik et al. | 345/467 |
| 2001/0179030 | * | 7/2001 | Lee et al. | 707/737 |
| 2009/0292787 | A1 * | 11/2009 | Hosokawa | 709/206 |

OTHER PUBLICATIONS

Hunt, Ela "A Database Index to Large Biological Sequences" Proceedings of the 27th VLDB Conference, 2001, pp. 10.*
Ukkonen, E"On-Line Construction of Suffix Trees" Algorithmica 1995, Dec. 8, 1993, pp. 12.*
Mansour, et al "ERA: Efficient Serial and Parrallel Suffix Tree Construction for Vary Long Strings"; Proceedings of the VLDP Endowment, vol. 5, No. 1; Aug. 2012; pp. 1-12.*
Barsky, et al "Suffix Trees for Vary Large Genomic Sequences"; CIKM'09; Nov. 2009; pp. 1-4.*
Phoophakdee, B. and Zaki, M. "Genome-scale disk-based suffix tree indexing", in Proceedings of the ACM International Conference on Management of Data, 2007, pp. 833-844.
Tian, et al., "Practical methods for constructing suffix trees", in VLDB Journal 14, 3 (2005), pp. 281-299.

* cited by examiner

*Primary Examiner* — Jacob F Bétit
*Assistant Examiner* — Amanda Willis
(74) *Attorney, Agent, or Firm* — Scully, Scott, Murphy & Presser, P.C.; Louis J. Percello, Esq.

(57) ABSTRACT

System and method for suffix tree creation for large input data/text streams. The methodology leverages the structure of suffix trees to build a suffix tree by simultaneously tiling accesses to both the input string as well as the partially constructed suffix tree. The end result enables the indexing of very large input strings and at the same time maintain a bounded working set size and a fixed memory footprint. The method is employed for serial processing. Further, a scalable parallel suffix tree construction is realized that is suitable for implementation on parallel distributed memory systems that use effective collective communication and in-network caching. The methodology is also applied for suffix link recovery in both serial and parallel implementations.

25 Claims, 12 Drawing Sheets

50

Input: Input string S, Prefix p
Output: Suffix sub-tree $T_p$
1   $T_p$ = NULL;
    /* Insert suffix $S_i$ into $T_p$, reusing the path for suffix
    $S_j$ : $0 \leq j < i$ that shares the longest common prefix with $S_i$     */ ;
2   for (i = 0, i < len(S), i + +) do
3       if prefix(p, $S_i$) then
4           addSuffix($S_i$, $T_p$);
5       end
6   end

75

```
Input: Input string S, Block size B, Maximum Tree
       Size MTS, Node Size NS, Range r
Output: Set of variable-length prefixes P
1  P = { } ;
2  prefixLength = 1 ;
3  while true do
4  |    minPLength = prefixLength ;
5  |    maxPLength = minPLength+ r ;
6  |    Count[ ] = { } /* Map for prefix counts       */;
7  |    for (i = 0, i < n, i+ = B) do
   |    |    */ Read B + maxPLength bytes at i    */ ;
8  |    |    Sb = S[i, i + B + maxPLength − 1] ;
9  |    |    for (j = 0, j < B, j+ = 1) do
   |    |    |    /* Read prefixes of length minPLength
   |    |    |       ... maxPLength at j           */ ;
10 |    |    |    Q = {S_b[j, j + minPLength − 1],
   |    |    |         ··· , S_b[j, j + maxPLength − 1]} ;
   |    |    |    /* If proper prefix of p ∈ Q not in P,
   |    |    |       maintain count for p          */ ;
11 |    |    |    for each p ∈ Q do
12 |    |    |    |    if ¬properPrefixExists(p, P) then
13 |    |    |    |    |    Count[p]+ = 1;
14 |    |    |    |    end
15 |    |    |    end
16 |    |    end
17 |    end
18 |    if empty(Count) then break ;
   |    /* If prefix count < MTS/(2×NS), add to P    */ ;
19 |    for each p ∈ Count do
20 |    |    if Count[p] < MTS/(2×NS) then add p to P ;
21 |    end
22 |    prefixLength = prefixLength+ r + 1 ;
23 end
```

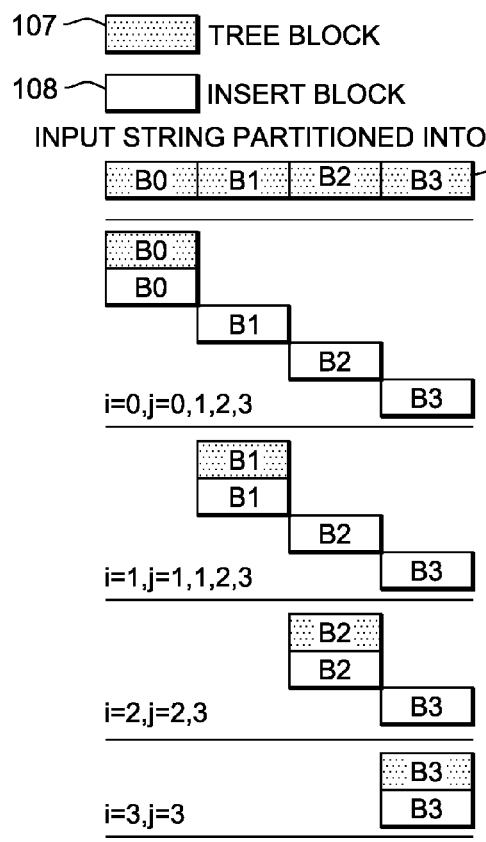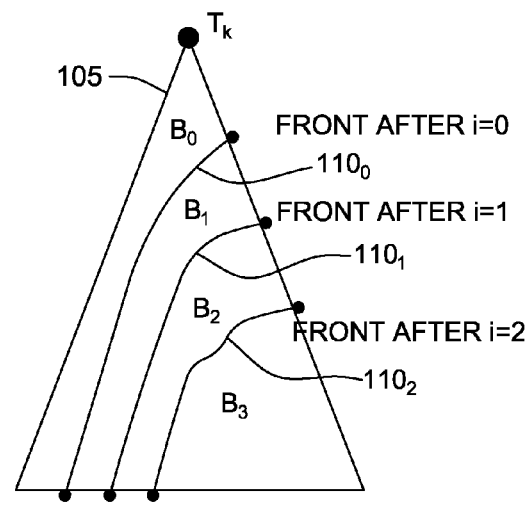
FIG. 4A

```
Input: Input string S, Prefix p, Block Size B
Output: Suffix sub-tree Tp
1  Tp = { };
   /* Find all occurrences of p in string S                                    */;
2  pLocs = FindPrefixLocations(p,S) ;
3  AE[ ] = { } /* Active Edge array                                            */;
4  TI[ ] = { } /* Tree Index array            } 110                            */;
5  SI[ ] = pLocs /* String Index array                                         */;
6  EOB = { } /* EOB suffix list                                                */;
7  Front = {0, . . . , sizeof(pLocs) − 1} ; /* List of active indices in AE, TI, and SI  */;
8  for (i = 0, i < n/B, i + +) do
      /* Read ith Tree Block ─────── 107                                       */;
9  |  TreeBlock = S[ i × B, i × B + B − 1] ;
      /* Start with the first element in the front                             */;
10 |  cnt = firstElement(Front) ;
11 |  for ( j = i, j < n/B, j + +) do
         /* Skip unneeded Insert Blocks                                        */;
12 |  |  if SI[cnt] > j × B + B − 1 and EOB = { } then continue ;
         /* Read Insert Block                                                  */;
13 |  |  InsertBlock = S[ j × B, j × B + B − 1] ;
         /* Process end-of-block suffixes                                      */;
14 |  |  for each k ∈ EOB do
15 |  |  |  addSuffix(SI[k],AE[k], TI[k]) ; ──── 110A
16 |  |  |  if Incomplete insertion then
17 |  |  |  |  if end of InsertBlock not reached during insertion then remove(EOB, k);
18 |  |  |  end
19 |  |  |  else
            /* Suffix has been completely
               inserted, hence remove from front and EOB                       */;
20 |  |  |  |  remove(EOB, k) ;
21 |  |  |  |  remove(Front, k) ;
22 |  |  |  end
23 |  |  end
         /* Process suffixes that have a String
            Index in InsertBlock                                               */;
24 |  |  while j × B ≤ SI[cnt] ≤ j × B + B − 1 do
25 |  |  |  addSuffix(SI[cnt], AE[cnt], TI[cnt]) ; ──── 110B
26 |  |  |  if Incomplete insertion then
27 |  |  |  |  if end of InsertBlock reached during insertion than then add (EOB,cnt)
28 |  |  |  end
29 |  |  |  else
            /* Suffix has been completely inserted, hence remove from front    */;
30 |  |  |  |  remove(Front, cnt) ;
31 |  |  |  end
            /* Pick next element in front                                      */;
32 |  |  |  cnt = nextElement(Front) ;
33 |  |  end
34 |  end
35 end
```

Input: Input string S, Set of suffix sub-trees T , Block Size B
Output: Set of link recovery tasks L
1  L = { }; for each t ∈ T do
2      for each block b of size B in S do
3            Traverse t such that accesses lie in b and find all internal nodes n that have a suffix link to a root node in T ;
4            Insert address of n and size of the sub-tree below n into L ;
5      end
6 end

Input: Input string S, Set of suffix sub-trees T , Block Size B, Set of link recovery tasks L
Output: Set of suffix sub-trees T with suffix links
1 for each t ∈ T do
2      Find set of link recovery tasks $L_t$ that point to t ;
3      for l ⊂ $L_t$ such that l + t fit in memory do
4            for each block b of size B in S do
5                Traverse each tree in l such that accesses lie in b and set suffix links to t;
6            end
7            $L_t = L_t - l$ ;
8      end
9 end

Input: Input string S, Memory Budget M, Number of Processors C
Output: Suffix Tree T
1 BuildInNetworkStringCache (S, M, C) (Collective);
2 P = GenerateTasks(S, M, C) (Collective);  — 315
3 while P not empty do
4    p = GetNextAvailableTask(P) (Collective);
5    L = LocatePrefix(p, S) (Collective);
6    $T_p$ = BuildSubTree(p, L, S) ;
7 end
$T = \bigcup_{p \in P} T_p$
9 RecoverSuffixLinks(T) (Collective);

FIG. 9

Input: Input string S, Set of suffix sub-trees T , Block Size B
Output: Set of suffix sub-trees T with suffix links
/* Phase 1                                                                                            */ ;
1   L = { } ;
2   for each t ∈ T do
3       for each block b of size B in S do
4           Traverse t such that accesses lie in b and find all internal nodes v that have a suffix link to a root node of a sub-tree in T ;
5           For each internal node v that satisfies the above condition, insert address of v and size of the sub-tree below v into L ;
6       end
7   end
8   Exchange tasks with other processors using an AlltoAll collective exchange ;
/* Phase 2                                                                                            */ ;
9   for each t ∈ T do
10      Find set of link recovery tasks $L_t$ that point to t ;
11      for l ⊂ $L_t$ such that l + t fit in memory do
12          Collectively read l into the processor's memory ;
13          for each block b of size B in S do
14              Traverse each task in l such that accesses lie in b and set suffix links to the correct position in sub-tree t;
15          end
16          $L_t$ = $L_t$ − l ;
17          Collectively write l to the file system ;
18      end
19  end

FIG. 10

SERIAL AND PARALLEL METHODS FOR I/O EFFICIENT SUFFIX TREE CONSTRUCTION

BACKGROUND

Over the past three decades, the suffix tree has served as a fundamental data structure in text or data string processing. However, its widespread applicability has been hindered by the fact that suffix tree construction is believed to not scale well with the size of the input string. With advances in data collection and storage technologies, large strings have become ubiquitous, especially across emerging applications involving text, time series, and biological sequence data. To benefit from these advances, it is imperative that a scalable suffix tree construction algorithm be realized.

There recently has been an emergence of several disk-based suffix tree construction algorithms that attempt to index strings that do not fit in memory. However, construction times continue to be daunting—for e.g., indexing the entire human genome still takes over 30 hours on a system with 2 gigabytes of physical memory.

Current extant disk-based tree construction algorithms are limited in the following regards: 1) To garner reasonable disk I/O efficiency, the algorithms require the input string to fit in main memory. Although existing "partition-and-merge"-based approaches such as those described in the reference to Phoophakdee, B. and Zaki, M. entitled "Genome-scale disk-based suffix tree indexing", in Proceedings of the ACM International Conference on Management of Data, 2007; and, the reference to Tian, Y., Tata, S., Hankins, R., and Patel, J., entitled "Practical methods for constructing suffix trees", in VLDB Journal 14, 3 (2005), do attempt to remove this restriction, they teach accessing the input string in a near-random fashion during a merge phase. As a consequence, when the input string does not fit in main memory, disk I/O latency dominates. 2) If one were to employ parallel processing offered by modern high performance computing systems to reduce operation times, existing techniques would require that each processor house the entire input string. This is simply not possible given that most state-of-the-art massively parallel systems have a small, fixed amount of memory (for e.g., 512 MB) per processing element. More often than not, these systems are disk-less and do not offer virtual memory support. Consequently, large scale parallel suffix tree construction using existing algorithms is not trivial.

That is, existing suffix tree construction algorithms cannot be trivially parallelized on such systems for the following reasons: (1) Due to limited main memory per processor, the input string being indexed cannot always be maintained in-core, and needs to be maintained and read off the network file system. Accessing the suffix tree during the tree construction and link recovery processes requires accessing the input string (using start and end indices). These accesses are near random and hence the processes are extremely I/O inefficient when the input string does not fit in main memory. Parallel operations become latency bound. (2) The link recovery task requires all processors to simultaneously have both read and write access to nearly all suffix sub-trees. On massively parallel systems, this quickly leads to I/O contention and limits scalability. (3) Naive parallelization results in significant amount of redundant work being performed, which also limits its scalability.

Due to the aforementioned limitations, suffix trees have lost bearing when it comes to indexing and querying large input strings.

It would be highly desirable to provide a proposed approach that affords improvements of several orders of magnitude when indexing large strings.

Furthermore, it would be highly desirable to provide a locality-conscious algorithm for suffix tree construction to efficiently build very large suffix trees for strings that are significantly larger than the size of main memory in both a serial as well a parallel setting.

BRIEF SUMMARY

There is provided, in one aspect, a system, method and computer program product implementing a novel algorithm that leverages the structure of suffix trees to build a suffix tree by simultaneously tiling accesses to both the input string as well as the partially constructed suffix tree. The end result is a method and system that can index very large input strings and at the same time maintain a bounded working set size and a fixed memory foot-print. The proposed methodology is applied to the suffix link recovery process as well, realizing an end-to-end I/O efficient solution.

In a further aspect, a parallel suffix tree construction algorithm is provided that is designed to index out-of-core input strings and maintain a constant working set size and a fixed memory foot-print at all times.

In accordance with one aspect, there is provided a system, method and computer program product for building a suffix tree for a string of text or data, the method comprising: providing a processing device having an associated memory storage device, constructing, using the processing device, a set of prefixes (p) for the input string; building a suffix sub-tree ($T_p$) for each prefix (p) of the constructed prefix set in the associated memory utilizing a constructor method, the constructor method including tiling access to the string and tiling access to suffixes as they are being inserted in the sub-tree; and, merging the suffix sub-trees to form the suffix tree, wherein during suffix sub-tree building, a set of sub-strings being referenced by a partially constructed suffix sub-tree, and a set of suffixes being inserted into the sub-tree is maintained within a fixed memory budget within the associated memory storage.

Further to this aspect, for a string of size n, the constructor method includes: partitioning the string into equal subset Treeblocks of size B, and partitioning edges in n/B partitions based on the Treeblock in which start indices of the partitioned edges lie, wherein the suffix sub-tree is built in n/B steps.

Advantageously, the aforementioned methodology, together with effective collective communication and in-network caching, allows for scalable parallel suffix tree construction that is especially suited to massively parallel distributed memory systems.

Thus, in a further aspect, there is provided a system, method and computer program product for building a suffix tree for a string of text or data comprising: a plurality of processor devices, each processor device having an associated memory coupled therewith, each processor running program instructions for performing a method comprising: allocating, at each corresponding processor device, a fixed amount of associated memory storage for storing a string cache; collectively reading the string into the associated allocated memory storage, wherein a processor device of the plurality receives a sub-string portion of the string, constructing a set of prefixes (P) for the string, each prefix corresponding to a suffix sub-tree such that, when independently constructed, the corresponding suffix sub-tree does not exceed the fixed amount of associated memory storage at a processor;

assigning prefixes (p) of the set (P) to the processors; building, at each processor device of the plurality, a suffix sub-tree ($T_p$) for each prefix (p) of the constructed prefix set in the associated memory utilizing a constructor method, the constructor method including tiling access to the sub-string at the associated allocated memory storage and tiling access to suffixes as they are being inserted in the sub-tree; and, merging the suffix sub-trees to form the suffix tree, wherein during suffix sub-tree building, a set of sub-strings being referenced by a partially constructed suffix sub-tree, and a set of suffixes being inserted into the sub-tree is maintained within a fixed memory budget within the associated memory storage.

Further to this embodiment, the constructing prefixes includes: collectively exchanging, among the processor devices, a subset of prefixes that is to be processed in a current iteration; finding, at each processor device of the plurality, locations for all prefixes in a partition of the input string; and, performing, by the processors, an All-To-All collective exchange using a message passing interface primitive.

The system and methodology is also applied for suffix link recovery in both serial and parallel implementations.

BRIEF DESCRIPTION OF THE SEVERAL VIEWS OF THE DRAWINGS

The objects, features and advantages of the present invention will become apparent to one ordinary skill in the art, in view of the following detailed description taken in combination with the attached drawings, in which:

FIG. 3 is a pseudocode representation of an example method for determining set of prefixes so as to partition the suffix tree into sub-trees according to one embodiment;

FIG. 4A conceptually illustrates the serialized method for constructing a tiled suffix sub-tree according to one embodiment;

FIG. 5 is a pseudo code representation of an example serialized method for constructing a tiled suffix sub-tree according to the embodiment depicted in FIG. 4A;

FIGS. 6A and 6B are pseudo code representations of example methods for the respective first and second phases of suffix link recovery according to the embodiment depicted in FIG. 4B;

FIG. 9 is a pseudocode representation of an example control flow for parallel suffix tree construction;

FIG. 10 is a pseudocode representation of an exemplary suffix link recovery method performed for the parallel suffix tree construction in two phases according to the embodiment depicted in FIG. 8;

DETAILED DESCRIPTION

The suffix tree is a fundamental data structure in string processing as it exposes the internal structure of a string in a way that facilitates the efficient implementation of a myriad of string operations. Examples of these operations include string matching (both exact and approximate), exact set matching, all-pairs suffix-prefix matching, finding repetitive structures, and finding the longest common sub-string across multiple strings. Over the past few decades, the suffix tree has been used for a spectrum of tasks ranging from data clustering to data compression. Its quintessential usage is seen in the bioinformatics domain where it is used to effectively evaluate queries on biological sequence data sets.

By way of background, and providing terminology that is used in the following description, the creation of a suffix tree is now generally described: Letting "A" denote a set of characters, $S=s_0, s_1, \ldots, s_{n-1}, \$$, where $s_i \in A$ and $\$ \bar{\in} A$, denotes a "$" terminated input string of length n+1. The $i^{th}$ suffix of S, denoted by $S_i$, is the substring $s_i, s_{i+1}, \ldots, s_{n-1}, \$$. The suffix tree for S, denoted as T, stores all the suffixes of S is a tree structure. The tree has the following properties: Paths from the root node to the leaf nodes have a one-to-one relationship with the suffixes of S. The terminal character $ is unique and ensures that no suffix is a proper prefix of any other suffix. Therefore, there are as many leaf nodes as there are suffixes. Edges spell non-empty strings. All internal nodes, except the root node, have at least two (2) children. The edge for each child node begins with a character that is different from the starting character of its sibling nodes. For an internal node v, let l(v) denote the substring obtained by traversing the path from the root node to v. For every internal node v, with $l(v)=x\alpha$, where $x \in A$ and $\alpha \in A^*$, there exists a pointer known as a suffix link to an internal node u such that $l(u)=\alpha$.

Figures 1, 2:
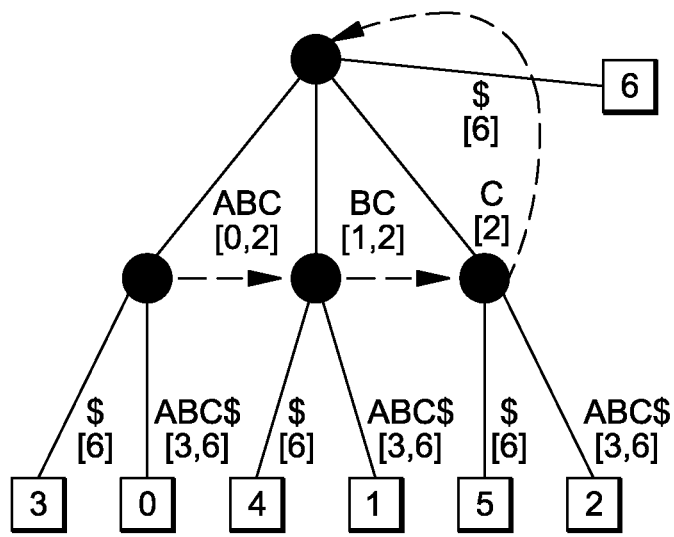
FIG. 1 depicts, for non-limiting purposes of illustration, an instance of an example suffix tree 10 for an example string S=ABCABC$.
FIG. 2 is a pseudocode representation of a method for creating a suffix sub-tree according to a prior art embodiment.

An instance of a suffix tree 10 for an example string S=ABCABC$ is presented in FIG. 1. Each edge in a suffix tree is represented using the start and end index of the corresponding substring in S. Therefore, even though a suffix tree represents n suffixes (each with at most n characters) for a total of $\Omega(n^2)$ characters, it only requires O(n) space. In the example suffix tree 10 for S=ABCABC$ depicted in FIG. 1, internal nodes are represented using circles and leaf nodes are represented using rectangles. Each leaf node is labeled with the index of the suffix it represents. The dashed arrows represent the suffix links. Each edge is labeled with the substring it represents and its corresponding edge encoding.

It is known that that such suffix trees can be built in linear space and time. While these algorithms provide theoretically optimal performance, they suffer from poor locality of reference. As a consequence, these algorithms are grossly inefficient when either the tree or the string does not fit in main memory.

Suffix Tree Construction

A method for efficiently building large disk-based suffix trees is now described according to one embodiment of the invention. The idea behind the method is that it is specifically designed to index out-of-core input strings and maintain a constant working set size and a fixed memory foot-print in a main memory at all times. The proposed approach departs from a prior known "partition-and-merge" methodology such as described in the reference to Y. Tian, S. Tata, R. Hankins, and J. Patel entitled "Practical methods for constructing suffix trees", VLDB Journal, 14(3), 2005 and, the reference to B. Phoophakdee and M. Zaki entitled "Genome-scale disk-based suffix tree indexing", Proceedings of the ACM International Conference on Management of Data, 2007. The first approach proposed by Tian et al., alternately referred to herein as "ST-MERGE" partitions the input string and constructs a suffix tree for each of these partitions in main memory. These suffix trees are then merged to create the final suffix tree. The second approach proposed by Phoophakdee et al., referred to herein as the "TRELLIS" differs in that this approach first finds a set of variable length prefixes such that the corresponding suffix sub-trees will fit in main memory; and, then, second, it partitions the input string and constructs a suffix tree for each partition in main memory (like st-merge) and stores the sub-trees for each prefix determined in the first step, separately, on disk. Finally, this methodology merges all the sub-trees associated with each prefix to realize the final set of suffix sub-trees. By design, trellis ensures that each of the suffix sub-trees (built using the merge operation) will fit in main memory.

The present invention is a method for constructing suffix trees that efficiently builds large disk-based suffix trees and is specifically designed to index out-of-core input strings and maintain a constant working set size and a fixed memory foot-print at all times. The proposed approach departs from the "partition-and-merge" methodology and directly builds a suffix tree by tiling accesses to both the suffix tree as well as input string during construction. The algorithm takes the memory budget (M) and input string (S) as input to perform the following main steps:

1. Prefix Set Creation: This step finds a set of prefixes, P, such that the sub-tree of the suffix tree associated with each prefix $p_i \in P$ can be built within the memory budget M;
2. Sub-tree Construction: This step builds the sub-tree (Tp) of the suffix tree for each prefix $p_i \in P$, within the memory budget M; and,
3. Suffix Link Recovery: This optional stage recovers the complete set of suffix links, should they be needed.

Typically, the suffix tree is an order of magnitude larger than the string being indexed. As a result, for large input strings, the suffix tree cannot even be accommodated in virtual memory, let alone main memory. Thus, a set of prefixes is found so as to partition the suffix tree into sub-trees (each prefix corresponds to a sub-tree) that can be built in main memory. This approach to partitioning a suffix tree into manageable chunks has been proposed previously, e.g., in TRELLIS. Particularly, letting $f(p_i)$ denote the number of times prefix $p_i$ occurs in S, "MTS" (Maximum Tree Size) denote the maximum amount of memory space in bytes that can be allotted to the sub-tree of the suffix tree during tree construction (Note: how MTS is determined is described in greater detail herein below); and, letting NS denote the size of a suffix tree node in bytes, the goal of this step is to find a set of prefixes P such that $$\forall p_i \in P, 2 \times f(p_i) < \frac{MTS}{NS}$$

i.e., it is desired to find a set of prefixes P such that each $p_i \in P$ occurs no more than $$\frac{MTS}{NS \times 2}$$

times in S. This guarantees that the sub-tree associated with each $p_i$ will not occupy more than MTS bytes of space. There are various ways to find the set P. One approach is to compose P using fixed-length prefixes of each suffix. This approach works well provided the data set is not skewed. However, many real string data sets are skewed (the human genome, for example). As a result, using a fixed prefix length can result in several partitions that are smaller than necessary, resulting in poor memory usage—ideally, it is desirable for each sub-tree to have a size as close to MTS as possible.

Observing that once the sub-tree associated with a prefix fits in main memory, it need not be extended, a second approach is to compose P using variable-length prefixes. Using variable length prefixes allows one to gracefully handle skewed data by allowing for the construction of sub-trees that are roughly of the same size. In this embodiment, variable length prefixes are employed. The pseudo code for prefix set creation is presented in the method 75 depicted in FIG. 3 which provides a multiple scan approach to find the set of variable length prefixes P, e.g., processing the steps 80 of the outer WHILE-END loop of the algorithm 75 of FIG. 3. That is, in the method 75 of FIG. 3, during each scan of the input string, the input string is iteratively read at B byte intervals (the value of B is determined as described in greater detail herein below), in blocks of size B+max-PLength, considering prefixes with lengths in the range minPLength through maxPLength during each scan (to limit memory consumption). Furthermore, throughout the running of this step, if a prefix $p_i \in Q$ is deemed to not be a candidate (e.g., as represented at lines 82 of the method 75 depicted in FIG. 3), all its super-set prefixes in Q are ignored (optimization is not shown in the method 75 depicted in FIG. 3). At the end of each scan, a prefix $p_i$ is added to P if no proper prefix of $p_i$ already exists in P and $$2 \times f(p_i) < \frac{MTS}{NS}.$$

This method 75 of FIG. 3 provides the desired set of variable-length prefixes, and, when implemented, consumes (little more than) B bytes of memory, ignoring memory consumed by the set P.

During subtree construction a sub-tree of the suffix tree (suffix sub-tree) is built for each $p_i \in P$. Relative to prefix set creation, this step consumes the majority of the run time. A "single-loop" approach as proposed in the reference to E. Hunt, M. Atkinson, and R. Irving entitled "A database index to large biological sequences", In Proceedings of 27th International Conference on Very Large Databases, 2001 is one way to build each sub-tree. The method for this "single-loop" approach is presented as the pseudo code 50 depicted in FIG. 2. In the approach depicted in the pseudo code provided in FIG. 2, each suffix $S_i$ with the prefix "p" is inserted into the tree, starting at the root node. An addSzeix method is employed to find a path in the tree that shares the longest common prefix with $S_i$ and splits from this path when no more matching characters are found. That is, this method matches $S_i$ with a suffix $S_j$: $0 \leq j < i$ that shares the longest common prefix with $S_i$. As each suffix ends with the unique terminal character ($), no suffix can be a proper prefix of any other suffix. Hence, every suffix insertion will end in a split and lead to the creation of a leaf node in the suffix tree. Random disk I/O may significantly degrade the performance of the method when the input string does not fit in main memory. For example, when inserting $S_i$, the addSuffix method accesses the suffix $S_j$: $0 \leq j < i$ that shares the longest common prefix with $S_i$. Although the part of the input string being referenced by $S_i$ is contiguous, that being referenced by $S_j$ need not be contiguous. In fact, for a random input string, $S_j$ will most likely be distributed across O(log n) different locations. This results in O(n log n) random seeks when constructing the suffix sub-tree.

An approach for disk-based suffix tree construction of out-of-core input strings is now described with respect to FIG. 5 which depicts pseudo-code representing an example method for disk-based suffix tree construction according to an embodiment of the invention. The example methodology depicted in FIG. 5, in one embodiment, is structured to build a suffix tree within a fixed memory budget, while maintaining a constant working set size, for strings of any length. There are three (3) entities that need to be accessed during suffix sub-tree construction as shown in FIG. 5:

1) the partially constructed suffix sub-tree,
2) the set of sub-strings being referenced by the suffix sub-tree, and,
3) the set of suffixes being inserted into the tree.

By construction, prefix set creation as described with respect to method 75 of FIG. 3 ensures that the suffix sub-tree will fit in main memory. Particularly, the computation is restructured so that both: the set of strings being referenced by the partially constructed suffix sub-tree, and the set of suffixes being inserted into the tree can be maintained in a fixed memory budget. In one embodiment, the method includes tiling of suffix sub-tree edge references. That is, as suffix trees have the property that the start index of each edge in the suffix tree is greater than the start index of its parent edge, thus, for a fully constructed suffix sub-tree, it is possible to partition its edges into disjoint partitions $E_0, E_1, \ldots, E_k$ based on their start indices such that the parent edge for each edge in partition $E_i$ is always located in a partition $E_j$:$j \leq i$. If the input string were to be partitioned into blocks of size B, and the edges were partitioned into n/B partitions based on the block in which their start indices lie, then the tree edges would be partitioned into n/B partitions where each partition has O(B) edges. This property serves as the basis for suffix sub-tree construction according to the embodiment of the present invention depicted in FIG. 5.

The pseudo-code for the tiled suffix sub-tree constructor method 100 is presented in FIG. 5. FIG. 4A depicts conceptually how the suffix sub-tree, $T_p$ 105, is constructed according to the tiled approach 100 provided in FIG. 5. For purposes of discussion, in the methodology 100 of FIG. 5, all InsertBlock and EOB references are first ignored. Assuming that the input string "S" is broken into blocks of size "B", giving a total of n/B blocks (referred to as Tree-Blocks 107), the suffix sub-tree 105 is built in n/B steps. During the $i^{th}$ step, each suffix starting with the prefix "p" is inserted into the suffix tree such that the input string references (due to the tree edges) lie in the $i^{th}$ TreeBlock. At the end of the $i^{th}$ step, all leaf nodes with parent edges that have a start index in the $i^{th}$ TreeBlock will be created—the corresponding suffixes have been completely inserted into the suffix tree and no more work needs to be performed for these suffixes. Furthermore, all internal node edge accesses that lie in the $i^{th}$ TreeBlock will be complete. In this approach, at the end of the $i^{th}$ step, each suffix is either completely inserted or inserted to a point where all input string references (due to tree edges) up to the $i^{th}$ TreeBlock are complete. For suffixes that fit the latter condition (i.e., inserted to a point where all input string references up to the $i^{th}$ Tree block are complete, more work needs to be performed in the following steps: As shown in FIG. 4A, for these, there is saved a front $110_i$ (for i<n/B) of the computation performed up to the $i^{th}$ step and, from this front in the $(i+1)^{th}$ step computation is resumed. This front data 110 includes: the Active Edge (AE) for indicating which tree edge was processed last, the Tree Index (TI) that informs the index (between start and end index) up to which this edge was processed, and the String Index (SI) that informs how many characters for this suffix have already been inserted. That is, referring to FIG. 5, for each suffix being inserted that needs further work, the front data is recorded at 110a and 110b: The corresponding front data structures 110 are carried for each successive iteration until it is empty—which is guaranteed to happen when the last TreeBlock 107 is processed. Although this front has O(n) entries, for a random input string (e.g., from a symmetric Bernoulli distribution), only O(B) of these entries are processed during each step. This property allows one to maintain a constant working set size.

The above mentioned approach assumes that the suffixes being inserted into the suffix sub-tree are always available in main memory. When processing large strings which may not be available in main memory, this restriction is removed by restructuring computation such that accesses to the suffixes are tiled as they are inserted into the tree. Again, assuming that the input string "S" is broken into blocks of size B (referred to as "InsertBlocks" 108), the input string can be processed one InsertBlock at a time, as shown in the methodology for constructing the tiled suffix sub-tree 100 depicted in FIGS. 4A and 5. That is, for every TreeBlock 107, only the j≥i InsertBlocks 108 are needed. Introducing InsertBlocks 108 raises an issue in that it is now possible for a suffix insertion to be incomplete because the suffix crosses an InsertBlock boundary. These suffixes are saved as end-of-block (EOB) suffixes and are processed in the following iteration. After all InsertBlocks 108 are processed for a certain TreeBlock 107, EOB is guaranteed to be empty. In its entirety, suffix sub-tree construction consumes a maximum of MTS+2 B bytes of memory.

Figure 4B:
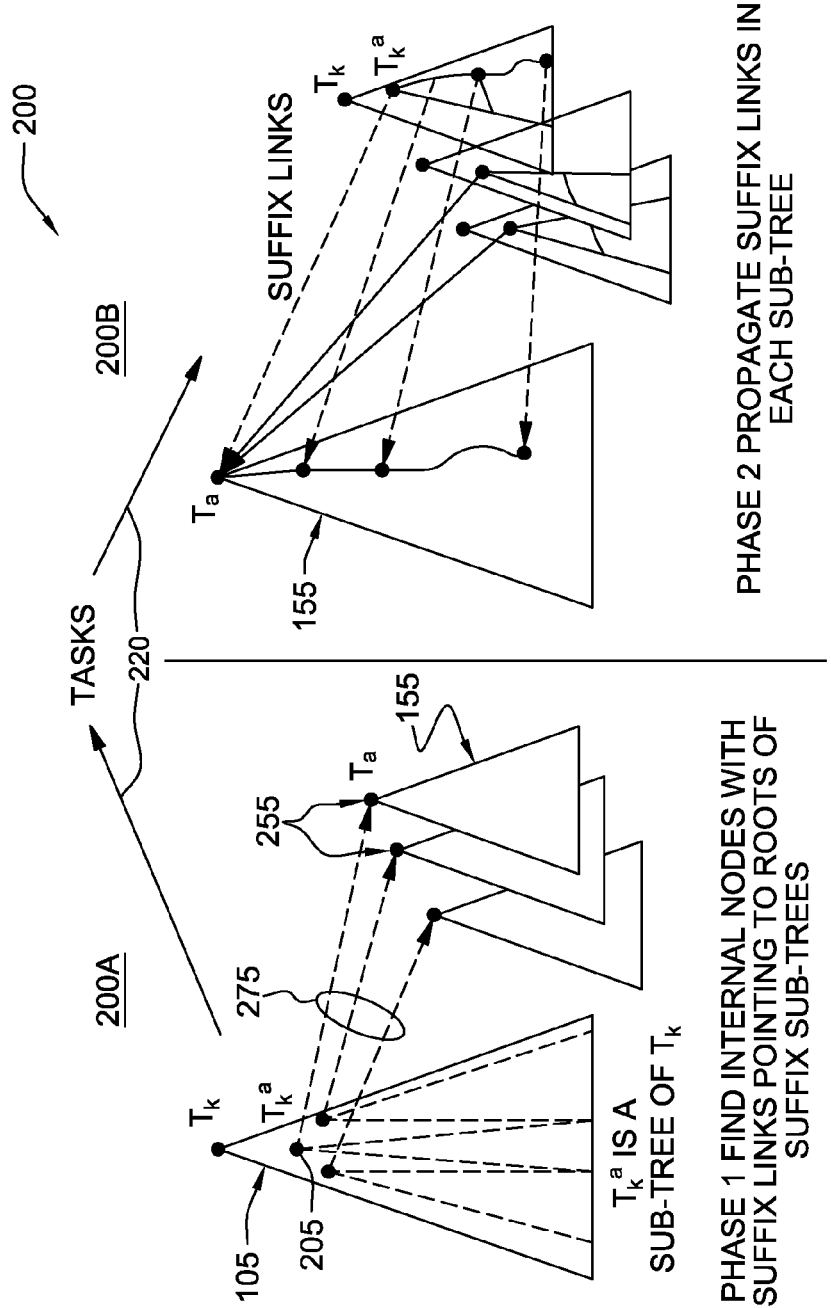
FIG. 4B conceptually illustrates the two phase method for recovering suffix links in the serial implementation according to one embodiment.

As many important string processing applications require suffix links, for such applications, an optional step of suffix link recovery is invoked. In one embodiment, an approach efficiently recovers suffix links after the suffix tree construction process as follows: First, the method restructures computation such that all accesses to the input string are tiled (as in the sub-tree construction process 100). Second, the method restructures computation to improve temporal locality. Suffix link recovery is performed in two phases and is conceptually illustrated in FIG. 4B as method 200. The pseudo code for the two phases is presented as method 200A (Phase 1) and as method 200B (Phase 2) depicted in FIGS. 6A and 6B, respectively. In the first phase 200A, as depicted in FIGS. 4B and 6A, each suffix tree $T_p$ is traversed and all internal nodes are found, e.g., the root node 205 of $T_k^a$ in FIG. 4B, that point to the root nodes 255 of other suffix sub-trees, for example, the root node of sub-tree $T_a$ 155. Thus, the suffix links 275 of all the child nodes of such an internal node 205 will always point to the child nodes of the node that is the pointed to by the suffix link of the internal node 205 (e.g., suffix links 275 for all nodes in $T_k^a$ 105 point to nodes in $T_a$ 155). Note that finding these internal nodes does not require traversal of the entire tree, but only up to the depth where one finds nodes with suffix links that point to root nodes 255 of suffix sub-trees. A methodology similar to tiled suffix sub-tree construction is employed wherein accesses to the input string are restructured such that at all times a string of size B in maintained in memory. At the end of Phase 1, for each suffix sub-tree, as indicated in FIG. 6A, there is output a set of recovery tasks "L". That is, at step 220a, at the end of the Phase 1, the method provides the addresses of the sub-trees within it (e.g., $T_k^a$) that can be processed independently with one other suffix sub-tree (for e.g., $T_a$)—these addresses constitute a set of recovery tasks 220a that are processed in Phase 2 200b).

In Phase 2 200b, shown in FIGS. 4B and 6B, each suffix sub-tree 155 is iteratively processed. For each suffix sub-tree, first, there is obtained a list of all tasks $L_t$ 220a that point to it. Next, the suffix sub-tree is loaded into main memory (e.g., for $T_a$) and the remainder of the memory budget is used to load as many tasks (e.g., $T_k^a$) into main memory as possible, without exceeding the memory budget. Finally, in FIG. 6B at 225, suffix links for all these tasks are assigned concurrently, tiling accesses to the input string. After this batch of tasks is processed, the sub-trees associated with these tasks are updated. The above procedure is repeated iteratively until all suffix sub-trees and their associated tasks are processed. By accessing the input string in a tiled fashion and maximizing tree reuse, the process is more I/O efficient. It is noted that since suffix links are always guaranteed to exist, during this phase, there is only need to access the string referenced in the link recovery tasks 220 (e.g., $T_k^a$), and not the suffix sub-tree being processed in the iteration (for e.g., $T_a$).

To afford an in-memory operation, there is maintained two entities in main memory—the suffix sub-tree and the input string blocks. Hence the method includes selecting an MTS and B such that MTS+2 B<M. When one increases MTS and correspondingly decreases B, tiling overheads reduce, but the I/O cost increases. On the other hand, when one decreases MTS and correspondingly increases B, tiling overheads increase, but I/O costs decrease. Hence, the methodology includes specifying these two parameters while being cognizant of their tradeoffs. In one example implementation, the memory budget is partitioned equally across the input string block and the suffix sub-tree.

Parallel Suffix Tree Construction

While modern parallel systems do not offer high (out-of-network) disk I/O band-width (per processing element), they do offer low in-network communication latency, and high in-network communication bandwidth. Coupled with the fact that such systems have a significant amount of aggregate main memory, disk I/O-intensive algorithms can continue to deliver high parallel performance as long as the processing elements can effectively utilize their collective main memories for data storage. Furthermore, effective collective communication can also aid in the management of their aggregate main memories and minimize redundant work.

Thus, the present methodology can be targeted for a class of supercomputing systems that are disk-less, provide relatively high I/O bandwidth (e.g., 1 GB/s through parallel I/O), and additionally provide very low in-network latency and high in-network bandwidth. An approach to parallel suffix tree construction, in one embodiment, is designed to index out-of-core input strings and maintain a constant working set size and a fixed memory foot-print at all times by tiling accesses to the input string and the partially constructed suffix tree during the construction and recovery processes. The algorithm only needs to access a fixed portion of the input string at any point during its operation. By caching this input string in the collective main memory of a parallel system, the approach can index large strings while constraining most data accesses to within the network. Moreover, by ensuring that the input string is accessed in a blocked fashion, once a block of the string is fetched from a remote processor, all processing can continue on the local copy of the block of the input string. Furthermore, the approach eliminates I/O contention problems faced by the link recovery tasks by restructuring computation to maximally re-use the suffix sub-trees once they are read into the network. Fast collective communication is leveraged to eliminate redundant work and manage All-to-All in-network data movement.

FIG. 9 is a pseudocode depiction of a method 300 that receives the memory budget (per processor) (M), input string (S), and number of processors (C) as input. The overall control flow of the method 300 is presented in FIG. 9 and is run by each processor in the system—collective procedures are noted in the pseudocode. The method 300 presented in FIG. 9 implements the following: (1) In-Network String Caching: This step uses the collective main memories of all the processors on the system to build a cache (with redundant copies) for the input string. This allows one to handle all string accesses within the network; (2) Task Generation: This step finds a set of prefixes P such that the sub-tree of the suffix tree associated with each prefix p ∈ P can be built within the memory budget M. Furthermore, this step ensures that the size of this set P is greater than the number of processors C; (3) Prefix Location Discovery: This step finds the location of a prefix p∈P in the input string; (4) Sub-tree Construction: This step builds the sub-tree (Tp) of the suffix tree for each prefix p∈P, within the memory budget M; and, (5) Suffix Link Recovery: This optional stage recovers the complete set of suffix links, should they be needed.

Figure 7:
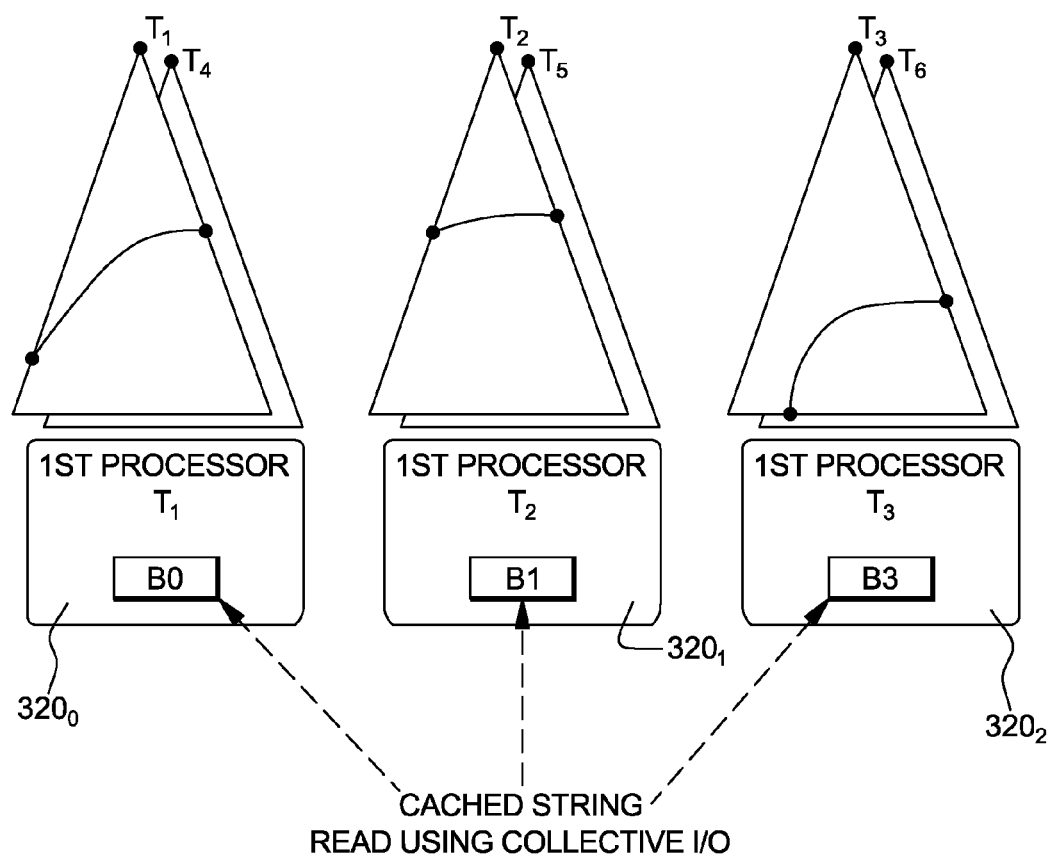
FIG. 7 conceptually depicts a method for building an in-network cache for the input string during an alternate embodiment that performs parallel suffix sub-tree construction.

As depicted conceptually in FIG. 7, the method 300 for parallel suffix sub-tree construction first involves building a respective in-network cache, e.g., $320_0$, $320_1$, $320_2$ for a respective input string such as input string blocks B, e.g., B0, B1, B2 depicted in FIG. 7. This is accomplished by having the processors reserve a fixed portion of their main memories for a string cache. The processors then collectively read the input string into their individual memories. MPI's (Message Passing Interface's) collective file I/O primitives are used to perform these operations. Collective I/O ensures that the same copy of the string is not read multiple times off disk. Once a piece of the string is read into the network, it is efficiently distributed across the network without repeated I/O. The string is replicated as many times as possible in a round robin fashion. All string accesses in the implementation are forwarded to the closest copy of the string in the network. Modern architectures support one-sided communication, where a processor can access the content of a remote processor's memory without interrupting the remote processor and several toolkits (such as global arrays) make it possible to implement such caching infrastructures efficiently. Since the method accesses the input string in a tiled fashion, the approach to caching the input string enables leveraging the high point-to-point network bandwidth on such systems.

As it is desired to find a set of prefixes so as to partition the suffix tree into sub-trees (each prefix corresponds to a sub-tree) that can be built in parallel, the method 300 of FIG. 9 makes use of the notation presented herein by letting f(p) denote the number of times prefix p occurs in S. Letting MTS (Maximum Tree Size) denote the maximum amount of memory space in bytes that can be allotted to the sub-tree of the suffix tree during tree construction, and letting NS denote the size of a suffix tree node in bytes, a set of prefixes P can be found such that the following three conditions are met:

$$(1) \; \forall \, p \in P: 2 \times f(p) < \frac{MTS}{NS}$$

$$(2) \; T = U_{p \in P} T_p$$

$$(3) \; |P| \geq C$$

The method includes finding a set of prefixes P such that each p∈P occurs no more than $$\frac{MTS}{NS \times 2}$$

times in S (Condition 1). This guarantees that the sub-tree associated with each p will not occupy more than MTS bytes of space. Furthermore, conditions 2) and 3) ensure that the union of these sub-trees will cover the entire suffix tree and that there are sufficient tasks to keep all the processors busy, respectively.

In one embodiment, P is composed using variable length prefixes as described herein above. A multiple scan approach to find the set of variable-length prefixes P can be implemented. Each processor is responsible for processing a partition of the input string. During each scan of the input string, each processor iteratively reads the input string at B byte intervals, in blocks of size B+sc−1 (sc is the scan number starting at 1) in its partition (the determination of size of B will be explained in greater detail herein below), considering prefixes of length sc during each scan (to limit memory consumption). At the end of the scan, the counts for the various prefixes of length sc discovered during the scan are collectively aggregated using a parallel merge in log C time. The master node then adds those prefixes that occur fewer than $$\frac{MTS}{NS \times 2}$$

to the task queue P, then each such prefix corresponds to a sub-tree of the suffix tree and can be built independently, and hence constitutes a task. Furthermore, during each scan, if a prefix of size sc has a proper prefix in the task queue determined up to the previous iteration, it is ignored as there is no longer need to extend it. For this purpose, before each scan, the master node broadcasts the task queue to all the slave nodes. This process continues until all potential prefixes are covered in the task queue and will give the desired set of variable-length prefixes. At the end of this process if |P|<C, MTS is reduced as per a geometric schedule and the process is repeated. In one embodiment, MTS is reduced by half.

Tasks discovered in this step are distributed across the processors, e.g., in a round robin fashion. Before suffix sub-tree construction proceeds, one needs to get the list of locations for each prefix being processed. If each processor were to scan the entire string to discover the location for its prefix p, there would be a significant wastage of computation and limited scale-up as most string accesses to find a matching prefix p would be wasteful. To improve performance, this step is performed collectively as there is significant overlap of computation across processors. This step proceeds as follows: First, the processors collectively exchange the subset of P that is to be processed in that iteration—let us call this set of prefixes Q. Second, each processor finds the locations for all prefixes in Q in a partition of the input string. The processors read the input string in blocks of size B+MaxLengthOfPrefix, where MaxLengthOfPrefix is the length of the longest prefix in Q. Finally, the processors perform an All-To-All collective exchange using the MPI_Alltoallv primitive (such as described at, http://www.mcs.anl.gov/research/projects/mpi/www/www3/MPI_Alltoallv.html), at the end of which, each processor has a list of locations for the prefix it is processing in that iteration.

Once each processor has the locations for its prefix, the processors proceed to build the suffix sub-tree for this prefix using an approach that is very similar to the serial approach in FIG. 5, the only major difference being that all string accesses are now forwarded to the in-network cache. After all the processors build the suffix sub-tree for its prefix, the processors collectively start processing the next set of prefixes, starting with the prefix location discovery phase. This process continues until all suffix sub-trees have been built.

Figure 8:
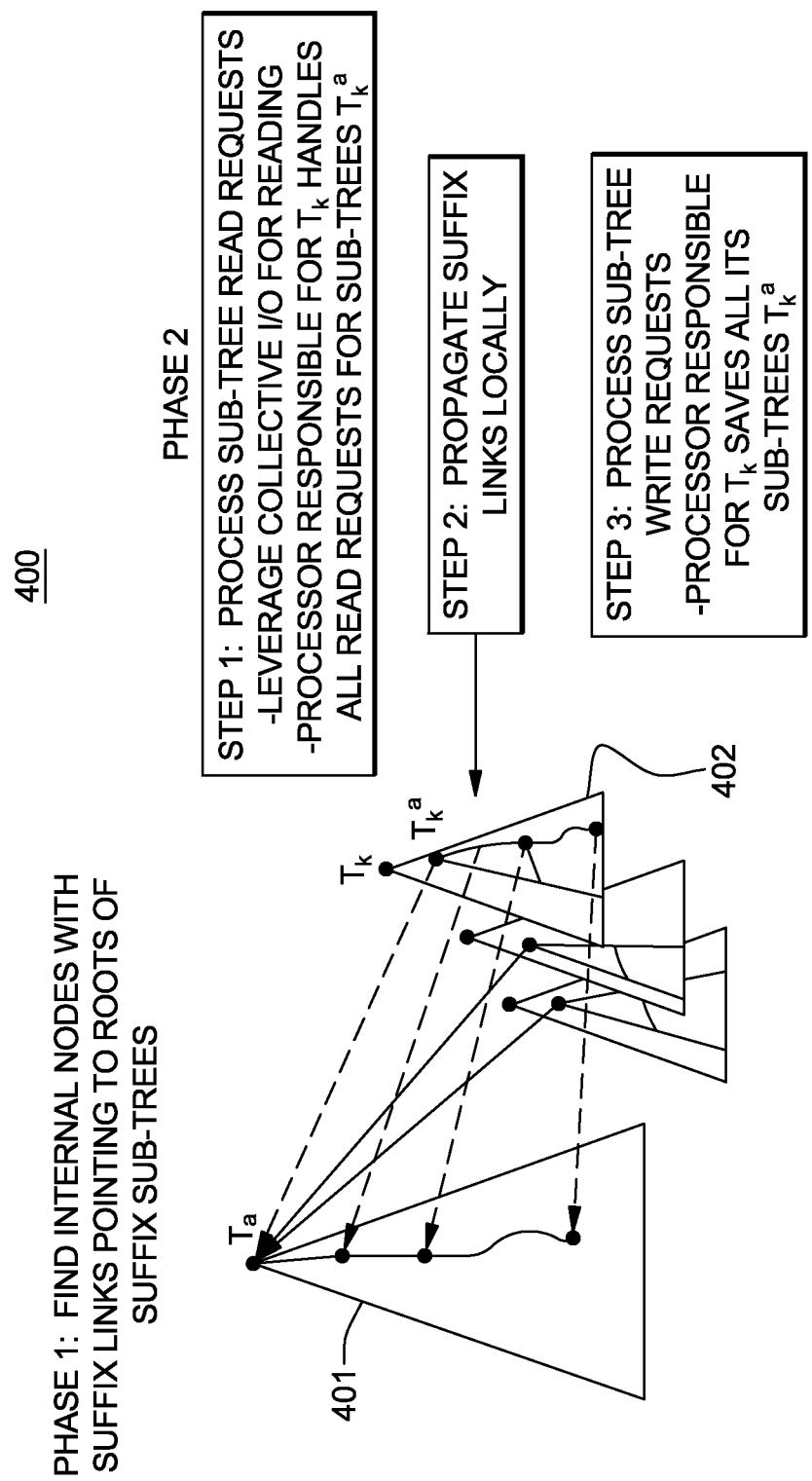
FIG. 8 conceptually depicts a method for link recovery as associated with the construction of a suffix sub-tree according to the parallel implementation.

Parallel suffix link recovery is extremely I/O intensive—the processors simultaneously need both read and write access to multiple suffix sub-trees. Thus parallel suffix link recovery is improved by improving the I/O efficiency of the process (through improved temporal locality) and minimizing I/O contention during operation (leveraging effective collective communication). Suffix link recovery is performed in two phases and is depicted conceptually in FIG. 8. The pseudo code for the two phases of the parallel suffix link recovery method 400 is presented in FIG. 10. In the first phase 400A, the sub-trees are distributed across the processors in a round robin fashion. Each processor then traverses each suffix sub-tree Tp that is assigned to it and finds all internal nodes (for example, the root node of $T_a$ in suffix subtree FIG. 8) that point to the root nodes of other suffix sub-trees (for example, the root node of $T_k^a$ in FIG. 8). As the suffix links of all the child nodes of such an internal node will always point to the child nodes of the node that is the pointed to by the suffix link of the internal node (for example, suffix links for all nodes in $T_k^a$ point to nodes in $T_a$). Note that finding these internal nodes does not require traversal of the entire tree—the procedure only needs to access the sub-tree up to a depth where it can find nodes with suffix links that point to root nodes of other suffix sub-trees. A methodology similar to tiled suffix sub-tree construction is used in that accesses to the input string are restructured such that at all times a string of size B is maintained in memory. At the end of this phase, for each suffix sub-tree, the addresses of the sub-trees within it are obtained (for example, $T_k^a$ that can be processed independently with one other suffix sub-tree (for example, $T_a$)—these addresses constitute tasks that will be processed in the second phase 400B. Once each processor has the list of tasks for all the suffix sub-trees assigned to it, an All-To-All exchange is performed, at the end of which, each processor has a complete list of tasks that point to one of the suffix sub-trees that is assigned to it.

In the second phase, each processor iteratively processes each suffix sub-tree. For each suffix sub-tree, first, there is obtained a list of all tasks that point to it. Next, the suffix sub-tree is loaded into main memory (for example, $T_a$) and the remainder of the memory budget is used to load as many tasks (for example, $T_k^a$) into main memory as possible, without exceeding the memory budget. Retrieving a task requires reading a sub-tree of the entire suffix sub-tree. If each processor were to do so independently on a massively parallel system, there would be significant I/O contention as each processor may have to read a sub-set of every tree in the worse case. To do so efficiently, first, each processor reads all the suffix sub-trees assigned to it iteratively and then exchanges portions of this tree that are requested by other processors in a collective fashion—this can be done very efficiently within the network and improves temporal reuse. Essentially, to maximize I/O efficiency, once a tree is read into the network, it is used to the maximum extent possible before purging it from main memory. Finally, the suffix links are assigned for all these tasks concurrently, tiling accesses to the input string. After this batch of tasks is processed, the sub-trees associated with these tasks are updated on disk. In order to update the suffix links on disk, each processor needs to write the sub-trees associated with the processed tasks (that span multiple suffix sub-trees) to disk. To do so efficiently, each tree is written to by a single processor. All the writes associated with this tree are exchanged between the processors using collective communication. The above procedure is repeated iteratively until all suffix sub-trees and their associated tasks are processed. The second phase is the more time consuming phase in the link recovery process—by accessing the input string in a tiled fashion and maximizing tree reuse, the process is more I/O efficient when compared with existing techniques.

Figure 11:
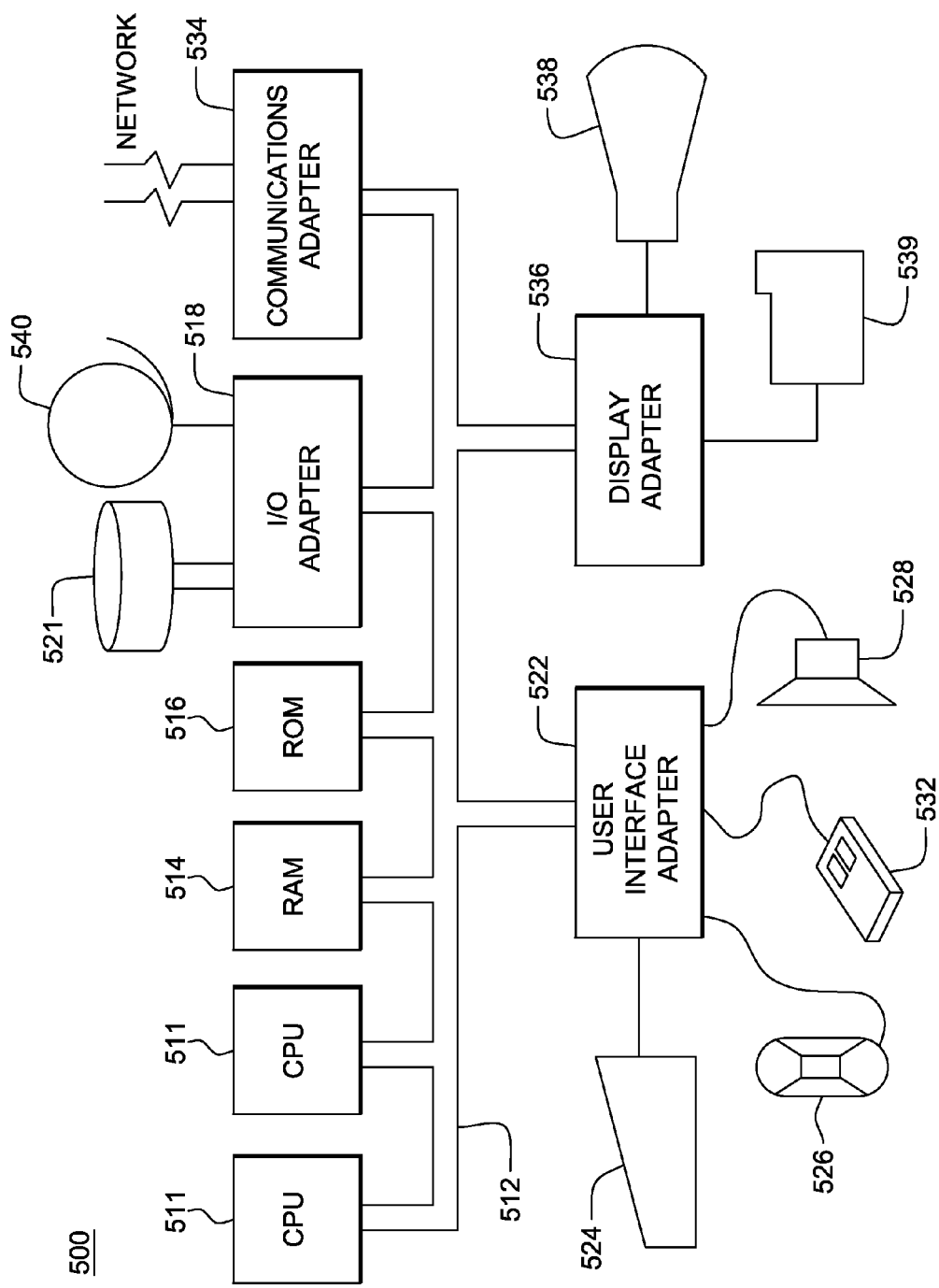
FIG. 11 illustrates an exemplary hardware configuration of a computing system 500 running and/or implementing the methods of the described embodiments; and, FIG. 12 is a detailed schematic block diagram illustrating one embodiment of the massively parallel, ultra-scalable supercomputer 600 for implementing the parallel suffix tree construction methodology of the present invention.

FIG. 11 illustrates an exemplary hardware configuration of a computing system 500 running and/or implementing the method steps for the serial suffix tree creation implementation. The hardware configuration preferably has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting the system 500 to a data processing network, the Internet, an Intranet, a local area network (LAN), etc., and a display adapter 536 for connecting the bus 512 to a display device 538 and/or printer 539 (e.g., a digital printer of the like).

For the embodiment of parallel suffix tree construction, a massively parallel supercomputing system is implemented such as the BluGene® systems such as available by International Business Machines Corporation (http://www.research.ibm.com/bluegene/index.html). The BluGene® parallel computing system, in one embodiment, is a distributed memory system having 1024 PowerPC 440 processors at 700 MHz and 512 MB of main memory per processor for parallel performance evaluation. This system has a three-dimensional torus network for point-to-point communication and a global tree network for collective communication. A description of a massively parallel computing system can be found in U.S. Patent Publication No. 2009/0006808 A1 (U.S. Ser. No. 11/768,905), the whole contents and disclosure of which is incorporated by reference as if fully set forth herein.

Figure 12:
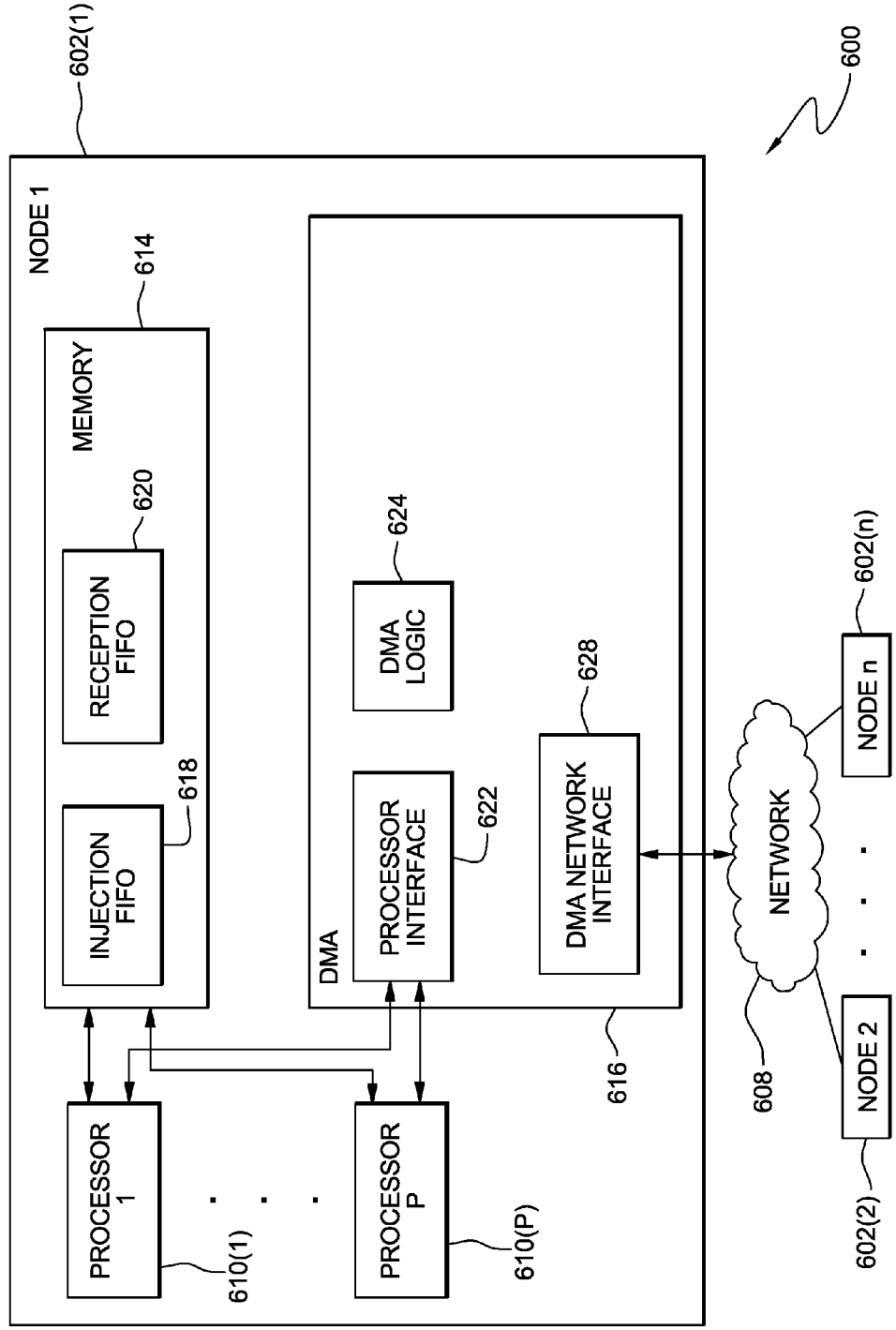

FIG. 12 provides a more detailed schematic block diagram illustrating one embodiment of the massively parallel, ultra-scalable supercomputer 600 implementing ASIC nodes including a DMA (Direct Memory Access) engine 616. Parallel computer system 600 comprises a plurality of individual compute nodes 602(1), 602(2) . . . 602(n), which, as mentioned, are constructed as single ASICs and interconnected across a network 608. FIG. 12 highlights an example construction of one of the compute nodes, ASIC 602(1). Each of compute nodes (602(n)) is fabricated to integrate all the functions of a computer into a single compute ASIC to enable a dramatic reduction in node size and power consumption. In a supercomputer, or parallel computer system, the reduced node size and its lower power consumption provides for increased node density thereby decreasing the overall cost/performance for the parallel computer system (600).

In more detail, compute node or ASIC 602(1) may function as both a compute node and an I/O node in the parallel computer system (600). Compute node 602(1) comprises a plurality of processors or processor cores, 610(1), . . . 610(p), where p is equal to four (p=4), or more, with each core having an associated memory and cache (not shown), and floating point cores (not shown).

Besides the embedded processing cores 610(p), and floating point cores, parallel computer system 600 includes a DMA 616, and a memory 614. In one embodiment, this memory may be implemented as a memory subsystem consisting of embedded DRAM, a memory controller, and normal DRAM Memory 614 including injection 618 and reception 620 FIFOs. Processors can read and write the memory as can a DMA engine 616. DMA engine 616 includes, but is not limited to, a processor interface 622, DMA logic 624, and a DMA network interface 628.

DMA engine 616 directly controls transfer of long messages, which long messages are typically preceded by short protocol messages that are deposited into reception FIFOs on a receiving node (for example, compute node 602(2)). Through these protocol messages, the sender compute node and receiver compute node agree on which injection counter and reception counter (not shown) identifications to use, and what the base offsets are for the messages being processed. The software is constructed so that the sender and receiver nodes agree to the counter ids and offsets without having to send such protocol messages.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

System and method for suffix tree creation for large input data/text strings. The methodology leverages the structure of suffix trees to build a suffix tree by simultaneously tiling accesses to both the input string as well as the partially constructed suffix tree. The end result enables the indexing of very large input strings and at the same time maintain a bounded working set size and a fixed memory footprint. The methodology is also applied to the suffix link recovery process. The method is employed for serial processing. Further, by using effective collective communication and in-network caching a scalable parallel suffix tree construction is realized that is suitable for implementation on massively parallel distributed memory systems.

The invention claimed is:

1. A method for building a suffix tree for a string of text or data of size n, said method comprising:
providing a processing device having an associated memory storage device,
allocating a fixed amount of memory within said associated memory storage device for storing an output sub-tree of the suffix tree and a portion of the input string during suffix tree building, wherein the length n of said input string exceeds the allocated fixed memory amount;
constructing, using said processing device, a set of prefixes (p) for said input string;
building a suffix sub-tree ($T_p$) for each prefix (p) of said constructed prefix set in said fixed memory amount utilizing a constructor method, said constructor method including: partitioning said string into a plurality of equal sized sub-string blocks of size B, and iteratively building a fixed portion of the output suffix sub-tree, wherein during each iteration i, where $0<i<n/B$:
accessing a sub-string block i;
inserting each suffix starting with the prefix p into the suffix tree such that the input string references from the edges in the partially constructed suffix sub-tree lie in the $i^{th}$ block; and
iteratively accessing each remaining equal sized sub-string block $j>i$ of said plurality, one sub-string block at a time, to process suffixes in each block starting with said prefix (p) that have a string index in said equal sized block i and inserting those suffixes in said tree such that during suffix sub-tree building at each iteration, said equal sized sub-string blocks being referenced by said partially constructed suffix sub-tree, and said suffixes being inserted into the sub-tree are maintained within said fixed memory amount and reused; and,
merging said suffix sub-trees to form said suffix tree.

2. The method as claimed in claim 1, wherein for said string of size n, said constructor method including:
partitioning edges in n/B partitions based on the block in which start indices of said partitioned edges lie, wherein said suffix sub-tree is built in n/B steps.

3. The method of claim 2, wherein said building a suffix sub-tree further comprises:
determining, at an end of said $i^{th}$ iteration, whether:
each suffix within said prefix p is completely inserted; or,
each suffix within said prefix p is inserted to a point where all string references due to sub-tree edges up to the $i^{th}$ block are complete.

4. The method of claim 3, wherein said building a suffix sub-tree comprises:
during each iteration i, where $0<i<n/B$, maintaining state information indicating the point up to which a suffix was inserted into said suffix sub-tree;
updating said state information at each iteration i; and
if determined that at an end of said $i^{th}$ iteration that each suffix within said prefix p is inserted to a point where all string references due to sub-tree edges only up to the $i^{th}$ block are complete, then
carrying said state information for subsequent iteration of a block (i+1) until said sub-tree suffix has been completely inserted.

5. The method of claim 4, wherein said state information includes data representing the suffix sub-tree edge that was processed last, the index (between start and end indices of said partially constructed sub-tree) up to which this edge was processed, and, the number of characters of this suffix that have been completely inserted.

6. The method of claim 4, wherein said determining further includes:
detecting whether at the end of said $i^{th}$ iteration, whether a suffix being inserted has crossed an InsertBlock boundary; and, for an inserted suffix detected as crossing an InsertBlock boundary, saving these suffixes as end-of-block (EOB) suffixes; and,
processing EOB suffixes in a following iteration.

7. The method of claim 2, wherein said suffix sub-tree construction consumes up to MTS+2B bytes of memory, where MTS is a Maximum Tree Size denoting the maximum amount of memory space in bytes allotted to a sub-tree of the suffix tree during tree construction, wherein MTS+2B<M, where M is a fixed memory budget of said associated memory storage.

8. The method of claim 1, further comprising:
recovering suffix links, said recovering comprising:
for each partitioned sub-string Block of size B;
traversing each said suffix sub-tree t; and, for accesses lying in each Block, finding all internal nodes that point to a root node of other suffix sub-trees; and, for each internal node found, recording an address of each internal node and a size of said sub-tree below the found node, wherein each address is associated with a corresponding link recovery task.

9. The method of claim 8, further comprising:
iteratively processing each suffix sub-tree, wherein at each iteration;
for each partitioned sub-string Block of size B;
loading both a suffix sub-tree and an Block into said associated memory storage device;
obtaining a set of link recovery tasks that point to said suffix sub-tree being processed, each recovery task of said set corresponding to a recorded address of an internal node; and,
setting suffix links to a correct position in a suffix sub-tree for said recovery tasks.

10. The method of claim 1, employed in a parallel computing system having a plurality of processor devices and each processor having an associated individual main memory, said method comprising:
reserving a fixed portion of a respective associated processor main memory as a string cache for receiving a sub-string of said string;
finding a set of prefixes, each prefix chosen such that a respective suffix sub-tree corresponding to a respective prefix is built within a fixed memory budget,
wherein each said corresponding suffix sub-trees are built in parallel.

11. A method for building a suffix tree for a string of text or data of size n, said method implemented in a parallel computing system comprising a plurality of processor devices, each processor device having an associated memory storage unit, said method comprising:
allocating, at each corresponding processor device, a fixed amount of memory within an associated memory storage for storing a string cache, said string cache adapted to store an output sub-tree of the suffix tree and a portion of the input string during suffix tree building, wherein the length n of said input string exceeds the allocated fixed memory amount;
collectively reading said string into said associated allocated memory storage, wherein a processor device of said plurality receives a sub-string portion of said string,
constructing a set of prefixes (P) for said string, each prefix corresponding to a suffix sub-tree such that, when independently constructed, the corresponding suffix sub-tree does not exceed said fixed amount of associated memory storage at a processor;
assigning prefixes (p) of said set (P) to said processors;
building, at each processor device of said plurality, a suffix sub-tree ($T_p$) for each prefix (p) of said constructed prefix set in said fixed memory amount utilizing a constructor method, said constructor method including:
partitioning said string into a plurality of equal sized sub-string blocks of size B, and iteratively building a fixed portion of the output suffix sub-tree, wherein during each iteration i, where $0<i<n/B$:
accessing a sub-string block i;
inserting each suffix starting with the prefix p into the suffix tree such that the input string references from the edges in the partially constructed suffix sub-tree lie in the $i^{th}$ block; and iteratively accessing each remaining equal sized sub-string block $j>i$ of said plurality, one sub-string block at a time, to process suffixes in each block starting with said prefix (p) that have a string index in said equal sized block i and inserting those suffixes in said tree such that during suffix sub-tree building at each iteration, said equal sized sub-string blocks being referenced by said partially constructed suffix sub-tree, and said suffixes being inserted into the sub-tree are maintained within said fixed memory amount and reused; and, merging said suffix sub-trees to form said suffix tree.

12. The method of claim 11, wherein said constructing prefixes includes:
collectively exchanging, among said processor devices, a subset of prefixes that is to be processed in a current iteration;
finding, at each processor device of said plurality, locations for all prefixes in a partition of the input string; and,
performing, by said processors, an All-To-All collective exchange using a message passing interface primitive.

13. The method of claim 11, further comprising:
recovering suffix links in parallel, said recovering comprising:
distributing sub-trees across the plurality of processor devices;
traversing, at each processor device, each said suffix sub-tree assigned thereto;
finding, at each processor device, all internal nodes that point to a root node of other suffix sub-trees; and,
recording, for each internal node found, an address of each internal node and a size of said sub-tree below the found node,
wherein each address is associated with a corresponding link recovery task.

14. The method of claim 13, further comprising:
performing, by said processors, an All-To-All collective exchange using a message passing interface primitive to result in distributing, to each processor, one or more link recovery tasks that point to one of the suffix sub-trees assigned to it.

15. The method of claim 14, further comprising:
iteratively processing, at each processor device of said plurality, each suffix sub-tree, wherein at each iteration;
obtaining a list of said one or more link recovery tasks that is assigned to that processor; and,
loading both a suffix sub-tree and a corresponding said one or more tasks into said fixed amount of associated memory storage,
wherein each processor device iteratively reads all the suffix sub-trees assigned to it and exchanges portions of each tree that are requested by other processors collectively.

16. The method of claim 15, further comprising:
at each iteration, propagating suffix links for each said loaded one or more tasks, in parallel, including tiling access to said sub-string stored at said associated allocated memory storage device; and,
at each processor device of said plurality, updating each said suffix sub-tree associated with the tasks.

17. The method of claim 16, wherein each said suffix sub-tree updating associated with the tasks, at each processor device, are performed in an external memory storage device, said method further comprising:
updating each said suffix links in said external memory storage device; said updating including writing, by each processor, the sub-trees associated with the processed tasks that span multiple suffix sub-trees to said external memory storage device.

18. The method of claim 17, wherein each said sub-tree is written by a single processor, the method further comprising: exchanging each write associated with the sub-tree between the processors using collective communication.

19. A system for building a suffix tree for a string of text or data of size n, the system comprising:
a memory;
a processor coupled to said memory, said processor running program instructions for performing a method comprising:
providing a processing device having an associated memory storage device,
allocating a fixed amount of memory within said associated memory storage device for storing an output sub-tree of the suffix tree and a portion of the input string during suffix tree building, wherein the length n of said input string exceeds the allocated fixed memory amount;
constructing a set of prefixes (p) for said input string;
building a suffix sub-tree ($T_p$) for each prefix (p) of said constructed prefix set in said fixed memory amount utilizing a constructor method, said constructor method including:
partitioning said string into sub-string blocks of size B, and iteratively building a fixed portion of the output suffix sub-tree, wherein during each iteration i, where $0<i<n/B$:
accessing a sub-string block i;
inserting each suffix starting with the prefix p into the suffix tree such that the input string references from the edges in the partially constructed suffix sub-tree lie in the $i^{th}$ block; and
iteratively accessing each remaining equal sized sub-string block $j>i$ of said plurality, one sub-string block at a time, to process suffixes in each block starting with said prefix (p) that have a string index in said equal sized block i and inserting those suffixes in said tree
such that during suffix sub-tree building at each iteration, said equal sized sub-string blocks being referenced by said partially constructed suffix sub-tree, and said suffixes being inserted into the sub-tree are maintained within said fixed memory amount and reused; and,
merging said suffix sub-trees to form said suffix tree.

20. The system as claimed in claim 19, wherein for said string of size n, said constructor method including:
partitioning edges in n/B partitions based on the block in which start indices of said partitioned edges lie, wherein said suffix sub-tree is built in n/B steps.

21. The system as claimed in claim 19, wherein said method further comprises:
recovering suffix links, said recovering comprising:
for each partitioned sub-string Block of size B;
traversing each said suffix sub-tree t; and,
for accesses lying in each Block, finding all internal nodes that point to a root node of other suffix sub-trees; and,
for each internal node found, recording an address of each internal node and a size of said sub-tree below the found node,
wherein each address is associated with a corresponding link recovery task, and,
iteratively processing each suffix sub-tree, wherein at each iteration;
for each partitioned sub-string Block of size B;
loading both a suffix sub-tree and an Block into said associated memory storage device;
obtaining a set of link recovery tasks that point to said suffix sub-tree being processed, each recovery task of said set corresponding to a recorded address of an internal node; and,
setting suffix links to a correct position in a suffix sub-tree for said recovery tasks.

22. A system for building a suffix tree for a string of text or data of size n comprising:
a plurality of processor devices, each processor device having an associated memory coupled therewith, each said processor running program instructions for performing a method comprising:
allocating, at each corresponding processor device, a fixed amount of memory within an associated memory storage for storing a string cache, said string cache adapted to store an output sub-tree of the suffix tree and a portion of the input string during suffix tree building, wherein the length n of said input string exceeds the allocated fixed memory amount;
collectively reading said string into said associated allocated memory storage, wherein a processor device of said plurality receives a sub-string portion of said string,
constructing a set of prefixes (P) for said string, each prefix corresponding to a suffix sub-tree such that, when independently constructed, the corresponding suffix sub-tree does not exceed said fixed amount of associated memory storage at a processor;
assigning prefixes (p) of said set (P) to said processors wherein each processor device includes a list of prefixes to be processed in an iteration;
building, at each processor device of said plurality, a suffix sub-tree ($T_p$) for each prefix (p) of said constructed prefix set in said fixed memory amount utilizing a constructor method, said constructor method including:
partitioning said string into sub-string blocks of size B, and iteratively building a fixed portion of the output suffix sub-tree, wherein during each iteration i, where $0<i<n/B$:
accessing a sub-string block i;
inserting each suffix starting with the prefix p into the suffix tree such that the input string references from the edges in the partially constructed suffix sub-tree lie in the $i^{th}$ block; and
iteratively accessing each remaining equal sized sub-string block $j>i$ of said plurality, one sub-string block at a time, to process suffixes in each block starting with said prefix (p) that have a string index in said equal sized block i and inserting those suffixes in said tree
such that during suffix sub-tree building at each iteration, said equal sized sub-string blocks being referenced by said partially constructed suffix sub-tree, and said suffixes being inserted into the sub-tree are maintained within said fixed memory amount and reused; and,
merging said suffix sub-trees to form said suffix tree.

23. The system as claimed in claim 22, wherein said constructing prefixes includes:

collectively exchanging, among said processor devices, a subset of prefixes that is to be processed in a current iteration;

finding, at each processor device of said plurality, locations for all prefixes in a partition of the input string; and, performing, by said processors, an All-To-All collective exchange using a message passing interface primitive.

24. The system as claimed in claim 22, wherein said method further comprises:

recovering suffix links in parallel, said recovering comprising:

distributing sub-trees across the plurality of processor devices;

traversing, at each processor device, each said suffix sub-tree assigned thereto;

finding, at each processor device, all internal nodes that point to a root node of other suffix sub-trees; and, recording, for each internal node found, an address of each internal node and a size of said sub-tree below the found node, wherein each address is associated with a corresponding link recovery task; and, performing, by said processors, an All-To-All collective exchange using a message passing interface primitive to result in distributing, to each processor, one or more link recovery tasks that point to one of the suffix sub-trees assigned to it.

25. The system as claimed in claim 24, wherein said method further comprises:

iteratively processing, at each processor device of said plurality, each suffix sub-tree, wherein at each iteration;

obtaining a list of said one or more link recovery tasks that is assigned to that processor; and, loading both a suffix sub-tree and a corresponding said one or more tasks into said fixed amount of associated memory storage, wherein each processor device iteratively reads all the suffix sub-trees assigned to it and exchanges portions of each tree that are requested by other processors collectively; and, at each iteration, propagating suffix links for each said loaded one or more tasks, in parallel, including tiling access to said sub-string stored at said associated allocated memory storage device; and, at each processor device of said plurality, updating each said suffix sub-tree associated with the tasks.

* * * * *